US012701091B2

(12) United States Patent
Schroder et al.

(10) Patent No.: US 12,701,091 B2
(45) Date of Patent: Aug. 4, 2026

(54) NETWORK DEVICE THAT UTILIZES PACKET GROUPING

(71) Applicant: Marvell Israel (M.I.S.L) Ltd., Yokneam (IL)

(72) Inventors: Jacob Jul Schroder, Lyngby (DK); Rami Zemach, Givat Shapira (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 538 days.

(21) Appl. No.: 17/860,465

(22) Filed: Jul. 8, 2022

(65) Prior Publication Data

US 2023/0013473 A1 Jan. 19, 2023

Related U.S. Application Data

(60) Provisional application No. 63/219,751, filed on Jul. 8, 2021.

(51) Int. Cl.
| | |
|---|---|
| *H04L 49/90* | (2022.01) |
| *H04L 47/62* | (2022.01) |
| *H04L 49/00* | (2022.01) |
| *H04L 49/901* | (2022.01) |
| *H04L 49/9057* | (2022.01) |

(52) U.S. Cl.
CPC ............ *H04L 49/90* (2013.01); *H04L 47/621* (2013.01); *H04L 49/3027* (2013.01); *H04L 49/901* (2013.01); *H04L 49/9057* (2013.01)

(58) Field of Classification Search
None
See application file for complete search history.

(56) References Cited

U.S. PATENT DOCUMENTS

| | | | | |
|---|---|---|---|---|
| 7,006,495 B2 * | 2/2006 | Hooper | ................. | H04L 12/185 370/312 |
| 8,244,909 B1 * | 8/2012 | Hanson | ................... | H04L 45/12 711/216 |
| 8,825,900 B1 * | 9/2014 | Gross, IV | ............... | H04L 47/31 709/238 |
| 10,200,313 B2 | 2/2019 | Zemach et al. | | |
| 2005/0083927 A1 * | 4/2005 | Lien | ........................ | H04L 45/16 370/389 |
| 2005/0240745 A1 | 10/2005 | Iyer et al. | | |

(Continued)

FOREIGN PATENT DOCUMENTS

WO 2017208182 A1 12/2017

OTHER PUBLICATIONS

International Search Report and Written Opinion for PCT Application No. PCT/IB2022/056350, mailed Sep. 15, 2022. (16 pages).

*Primary Examiner* — Jay L Vogel

(57) ABSTRACT

A packet group processor of a network device defines groups of packets among packets that are being processed by the network device, each of at least some of the groups of packets defining a respective group of at least two different packets. Each group includes one or more packets to be transmitted via a respective same network interface. A transmit processor makes a single transmit decision that a particular group of at least two packets is to be transmitted via a corresponding network interface, and in response to the single transmit decision, transfers the particular group of at least two packets to the corresponding network interface for transmission.

24 Claims, 8 Drawing Sheets

(56) References Cited

U.S. PATENT DOCUMENTS

| | | | |
|---|---|---|---|
| 2009/0002864 A1* | 1/2009 | Duelk | G06F 12/0607 |
| | | | 360/48 |
| 2011/0208874 A1 | 8/2011 | Mann et al. | |
| 2014/0169378 A1* | 6/2014 | Shumsky | H04L 49/552 |
| | | | 370/394 |
| 2014/0208138 A1* | 7/2014 | Homchaudhuri | |
| | | | H04W 52/0287 |
| | | | 713/320 |
| 2014/0307740 A1 | 10/2014 | Li et al. | |
| 2015/0215226 A1 | 7/2015 | Peled et al. | |
| 2018/0175880 A1* | 6/2018 | Rangachari | G06F 3/06 |
| 2021/0297354 A1 | 9/2021 | Zemach et al. | |
| 2022/0006737 A1* | 1/2022 | Chang | H04L 45/38 |

* cited by examiner

FIG. 4

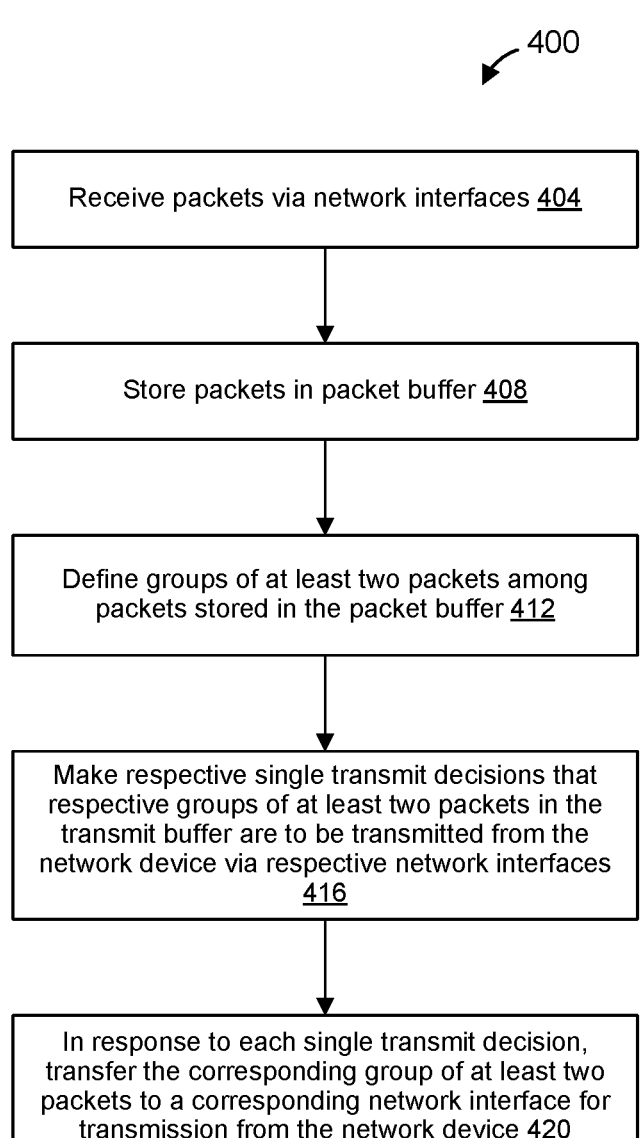

400

Receive packets via network interfaces 404

Store packets in packet buffer 408

Define groups of at least two packets among packets stored in the packet buffer 412

Make respective single transmit decisions that respective groups of at least two packets in the transmit buffer are to be transmitted from the network device via respective network interfaces 416

In response to each single transmit decision, transfer the corresponding group of at least two packets to a corresponding network interface for transmission from the network device 420

FIG. 6

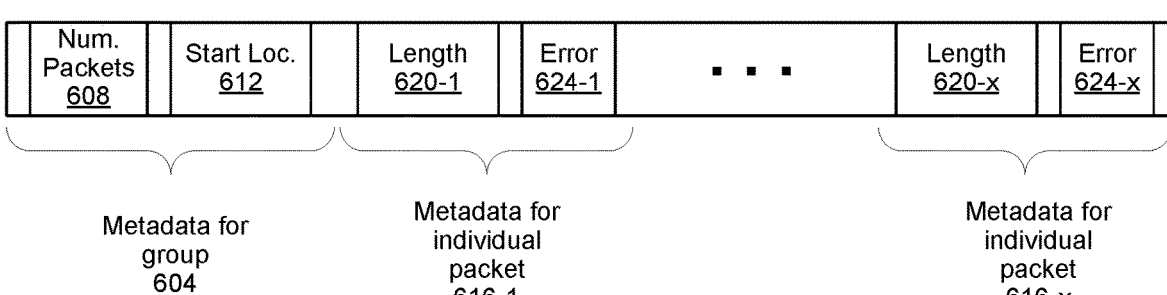

| Num. Packets 608 | Start Loc. 612 | Length 620-1 | Error 624-1 | ▪ ▪ ▪ | Length 620-x | Error 624-x |
|---|---|---|---|---|---|---|

Metadata for group 604

Metadata for individual packet 616-1

Metadata for individual packet 616-x

FIG. 7

| Num. Packets 608 | Start Loc. 720-1 | Length 620-1 | Error 624-1 | ▪ ▪ ▪ | Start Loc. 720-x | Length 620-x | Error 624-x |
|---|---|---|---|---|---|---|---|

Metadata for group 704

Metadata for individual packet 716-1

Metadata for individual packet 716-x

FIG. 8

| Num. Packets 608 | | Packet Descriptor 808-1 | ▪ ▪ ▪ | Packet Descriptor 808-x |
|---|---|---|---|---|

Metadata for group 804

NETWORK DEVICE THAT UTILIZES PACKET GROUPING

CROSS REFERENCES TO RELATED APPLICATIONS

This application claims the benefit of U.S. Provisional Patent App. No. 63/219,751, entitled "Packet Grouping for Improved Efficiency and Bandwidth," filed on Jul. 8, 2021, the disclosure of which is hereby expressly incorporated herein by reference in its entirety.

FIELD OF TECHNOLOGY

The present disclosure relates generally to communication networks, and more particularly to processing of packets in a network device.

BACKGROUND

Network devices such as network switches, routers, edge devices and the like often utilize packet memories to buffer packets while the packets are being processed by the network device and/or are awaiting transmission during times of congestion experienced by output ports of the network device. Typically, a network device utilizes either an internal packet memory (e.g., a packet memory implemented on a same chip as a packet processor of the network device) or external packet memory (e.g., a packet memory implemented as a separate device external to a packet processor chip of the network device). Internal packet memories are typically smaller than external packet memories, but internal packet memories typically have higher access bandwidths than external packet memories. External packet memories, on the other hand, are typically larger and provide more storage capacity than internal packet memories, but external packet memories typically have lower access bandwidths than internal packet memories. The lower access bandwidths of external packet memories do not have sufficient bandwidths to support buffering of full bandwidths supported by many current network devices.

In connection with processing packets, some network devices generate a packet descriptor for a received packet, the packet descriptor including metadata about the packet, such as information from a header of the packet and a location of the packet in the packet memory. The packet descriptor is processed at least to determine the port or ports of the network device to which to forward the packet, and the packet descriptor is then enqueued in one or more transmit queues corresponding to the determined port or ports. When the packet descriptor reaches a head of a transmit queue, the corresponding packet is retrieved from the packet memory for forwarding to the determined port or ports.

SUMMARY

In an embodiment, a network device comprises: a plurality of network interfaces configured to couple to a plurality of network links; a packet buffer; a receive processor configured to store in the packet buffer packets that are received by the network device via the plurality of network interfaces; a packet processor configured to process packets received via the plurality of network interfaces to make forwarding decisions regarding the packets; a packet group processor configured to define groups of packets among packets that are being processed by the network device, each of at least some of the groups of packets defining a respective group of at least two different packets, each group including one or more packets to be transmitted via a respective same network interface; and a transmit processor. The transmit processor is configured to: make a single transmit decision that a particular group of at least two packets in the transmit buffer is to be transmitted via a corresponding network interface, and in response to the single transmit decision, transfer the particular group of at least two packets to the corresponding network interface for transmission.

In another embodiment, a method for processing packets at a network device includes: storing in a packet buffer of the network device packets for transmission from the network device via a network interface of the network device; defining, at the network device, groups of packets among packets being processed by the network device, each of at least some of the groups of packets including at least two packets; making respective single transmit decisions, at the network device, that respective groups of packets in the transmit buffer are to be transmitted from the network device via the network interface, including making respective single transmit decisions that respective groups of at least two packets in the transmit buffer are to be transmitted from the network device via the network interface; and in response to each single transmit decision, transferring, by the network device, the corresponding group of packets to the network interface for transmission.

BRIEF DESCRIPTION OF THE DRAWINGS

FIG. 4 a flow diagram of an example method for processing packets in a network device configured to make single transmit decisions for respective groups of at least two packets, according to an embodiment.

FIG. 6 is a simplified block diagram of an example group descriptor that is used with various example implementations described herein, according to some embodiments.

FIG. 7 is a simplified block diagram of another example group descriptor that is used with various example implementations described herein, according to some other embodiments.

FIG. 8 is a simplified block diagram of another example group descriptor that is used with various example implementations described herein, according to some other embodiments.

DETAILED DESCRIPTION

In some embodiments described below, a network device is configured to make single transmit decisions regarding respective groups of packets, with each of at least some of the groups of packets including at least two packets. As an illustrative example, the network device generates group descriptors for respective groups of at least two packets that are to be transmitted via respective same network interfaces of the network device, and the group descriptors are enqueued in FIFO queues for scheduling transmission of the groups of at least two packets. Queuing and dequeuing of such group descriptors enable group scheduling of packets for transmission, as opposed to individually scheduling packets for transmission. Because groups of packets are scheduled for transmission per group, as opposed to scheduling each packet individually, the processing speed requirements and/or complexity of the network device are significantly reduced as compared to a network device that schedules the transmission of each packet individually.

In other embodiments described below, a network device additionally or alternatively is configured to utilize a first packet memory and at least one second packet memory for buffering packets received at the network device until the packets can be transmitted by the network device. In an embodiment, the network device is configured to initially store packets in the first packet memory, and to transfer packets to the at least one second packet memory. In an embodiment, buffers in the second packet memory are larger than buffers in the first packet memory, and the network device is configured to transfer one or more groups of at least two packets from the first packet memory in respective one or more transfers to the second packet memory, to more efficiently utilize the larger buffers in the second packet memory. Subsequently, prior to transmission of the group packets from the network device, the group of packets is transferred from the second packet memory back to the first packet memory.

Figure 1:
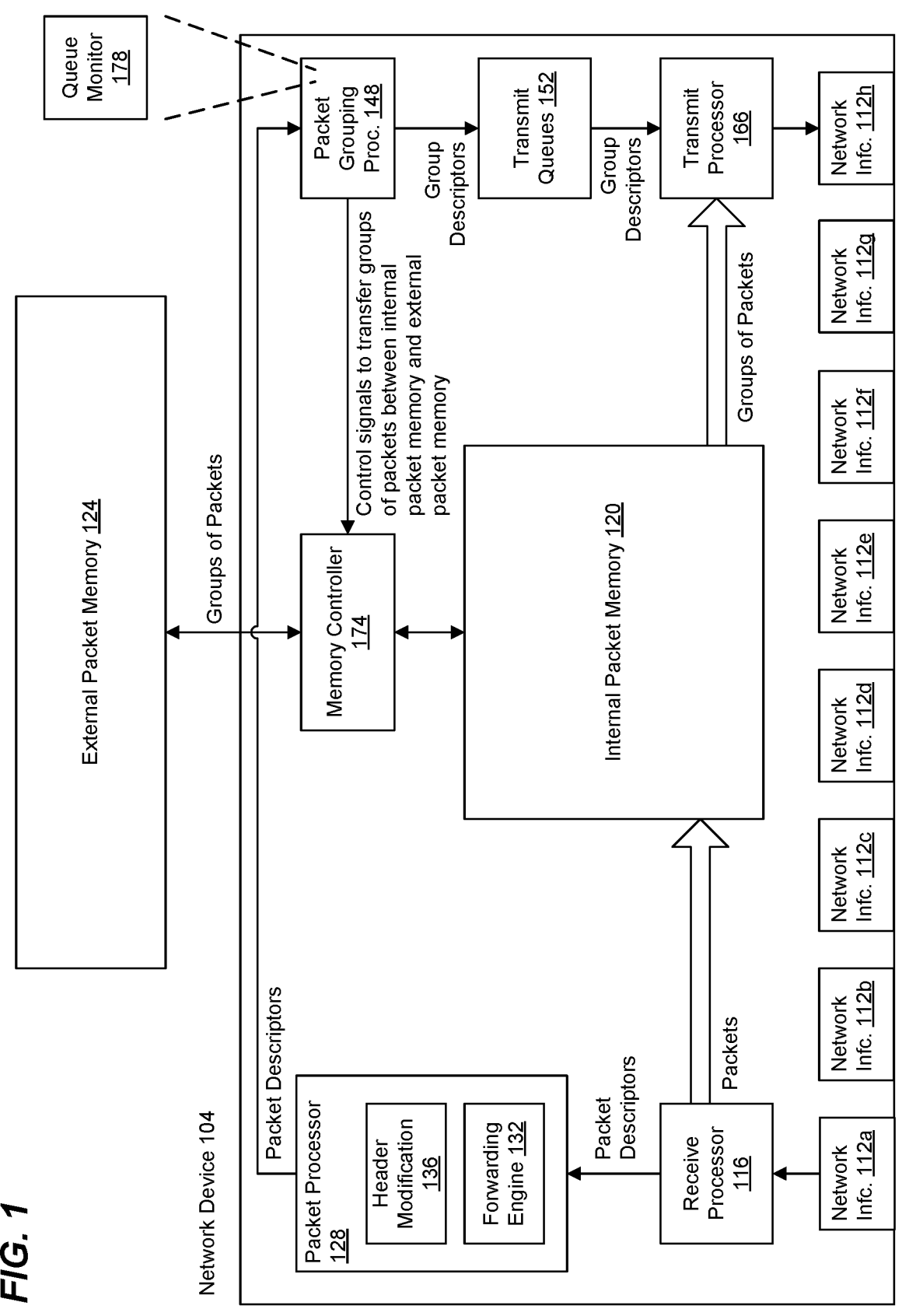
FIG. 1 is a simplified block diagram of an example network device configured to make single transmit decisions for respective groups of packets, according to an embodiment.

FIG. 1 is a block diagram of an example network device 104 that receives packets, processes the packets to determine network links via which the packets are to be forwarded, and transmits the packets via the determined network links, according to an embodiment. The network device 104 includes a plurality of network interfaces (e.g., ports) 112 configured to couple to respective network links. The network device 104 also includes one or more receive processors 116 coupled to the network interfaces 112. Although only one receive processor 116 is shown in FIG. 1 merely for ease of explanation, and the one receive processor 116 is shown as being coupled to only one network interface 112, the network device 104 includes multiple receive processors 116 and each of the multiple processors 116 is coupled to a respective set of one or more network interface 112, in some embodiments. The multiple receive processors 116 may be considered collectively as a single receive processor.

The receive processor 116 is configured to store packet data (e.g., at least payloads) corresponding to received packets in a packet memory 120. In an embodiment, the packet memory 120 is "internal" to the network device 104 and is sometimes referred to herein as the "internal packet memory 120". For example, the internal packet memory 120 is implemented on a same integrated circuit (IC) chip as one or more other components of the network device 104, such as the receive processor 116.

The network device 104 also includes, or is coupled to, one or more packet memories 124 that are "external" to the packet processor 104, e.g., implemented as one or more separate devices external to the network device 104, or are included in one or more separate devices external to the network device 104, in an embodiment. The one or more packet memories 124 are sometimes referred to herein as the "external packet memory 124" for brevity. In an embodiment, the network device 104 includes one or more ports and/or interfaces that provide coupling of the network device 104 to the external packet memory 124. For example, the network device 104 includes a peripheral component interconnect (PCI) interface, a PCI express (PCIe) interface, a double data rate (DDR) memory interface, a graphics double data rate (GDDR) memory interface, a flash memory interface, or any other suitable type of memory interface for coupling to the external packet memory 124, in various embodiments. As another example, one or more of the network interfaces 112 are used to couple the network device 104 to the external packet memory 124 instead of coupling the network device 104 to other network devices on a network, in an embodiment.

In another embodiment, the external packet memory 124 is implemented on a different chip than one or more other components of the network device 104, but the external packet memory 124 is nonetheless internal to the network device 104 (e.g., packaged together with other components of the network device 104). For example, in an embodiment, the external packet memory 124 is provided in place of a network port chiplet corresponding to a network interface 112, provided instead of a physical layer (PHY) chiplet corresponding to a network interface 112, etc., in various embodiments.

In an embodiment, the internal packet memory 120 is implemented using static random access memory (SRAM) technology, and the external packet memory 124 is implemented using dynamic random access memory (DRAM) technology. In other embodiments, the internal packet memory 120 and/or the external packet memory 124 are implemented using other suitable technologies. In an embodiment, the external packet memory 124 is implemented as double data rate (DDR) type memory. In other embodiments, the external packet memory 124 includes any suitable combination of one or more of a graphics double data rate (GDDR) memory, a flash memory, and any other suitable type of memory.

In some embodiments, the receive processor 116 stores an entire received packet in the internal packet memory 120. However, the receive processor 116 stores, for each of multiple packets, only an end portion of a received packet (e.g., including a payload and optionally a portion of a header) in the internal packet memory 120 at least initially, according to another embodiment. At least a portion of a header of the received packet is later stored in the internal packet memory 120 by the network device 104, according to an embodiment.

In an embodiment, the receive processor 116 includes direct memory access (DMA) circuitry (not shown) configured to store received packets (or at least portions of the packets) in the packet memory 120 via one or more read/write interfaces of the packet memory 120.

The receive processor 116 generates, for each of multiple packets received via network interfaces 112, a packet descriptor associated with the packet, according to an embodiment. Each packet descriptor includes information regarding the corresponding packet, such as header information from a header of the packet 124 and optionally control information associated with the packet, such as location information regarding a location of the corresponding packet in the packet memory 120, according to an embodiment. Each packet descriptor has a data length that is much shorter than a length of a typical packet, according to some embodiments. In an embodiment, the receive processor 116 is configured to extract header information from a received packet and store the extracted header information in a packet descriptor corresponding to the received packet.

In some embodiments, the receive processor 116 is configured to extract a fixed length of packet data from a beginning portion of a received packet and store the extracted information in a packet descriptor corresponding to the packet. For example, the receive processor 116 is configured to i) extract a first 128 bytes (or another suitable length) of packet data from the beginning portion of the packet and store the extracted information in the packet descriptor, according to an illustrative embodiment.

The receive processor 116 provides the packet descriptors to a packet processor 128, which is configured to process packets (e.g., by analyzing packet descriptors corresponding to the packets), in an embodiment. In other embodiments, the receive processor 116 (or the packet processor 128) stores packet descriptors in a packet descriptor memory (not shown) separate from the internal packet memory 120, and the packet processor 128 processes the packet descriptors stored in the packet descriptor memory. In such embodiments, a smaller packet descriptor includes an indicator of a location of the packet descriptor in the packet descriptor memory, and the smaller packet descriptor is passed between components of the packet processor 128. In such embodiments, the indicator (within the smaller packet descriptor) of the location of the packet descriptor in the packet descriptor memory is used by components of the packet processor 128 to access the packet descriptor. In some embodiments, the smaller packet descriptor optionally includes control information associated with the packet, such as location information regarding a location of the corresponding packet in the internal packet memory 120.

The packet processor 128 includes a forwarding engine 132. The forwarding engine 132 is configured to analyze at least header information in packet descriptors to determine network interfaces 112 via which packets (corresponding to the packet descriptors) are to be transmitted (referred to herein as "target network interfaces"). As merely an illustrative example, the forwarding engine 132 is configured to use at least a destination address in a header of a packet to perform a lookup in a forwarding database (not shown), which stores correspondences between destination addresses and network interfaces 112, to determine a target network interface 112 for the packet. As another illustrative example, the forwarding engine 132 is configured to use at least a VLAN ID in a header of a packet to perform a lookup in a forwarding database (not shown) (e.g., the same forwarding database discussed above or a different forwarding database), which stores correspondences between VLAN IDs and network interfaces 112, to determine a particular set of one or more target network interfaces 112 for the packet. The forwarding engine 132 is configured to store an ID of a target network interface (or set of multiple target network interfaces) in the packet descriptor corresponding to the packet, according to an embodiment.

The packet processor 128 also includes a header modification engine 136 that is configured to selectively modify header information (e.g., change a next hop network address, add a tunneling header, remove a tunneling header, etc.) in a packet that is to be transmitted via one or more of the network interfaces 112.

The packet processor 128 optionally also includes one or more other suitable components that are not shown in FIG. 1 and not described in detail for purposes of brevity, such as one or more of: a header modification engine, a tunnel termination engine that identifies packets corresponding to network tunnels that terminate at the network device 104, a traffic shaping engine, etc.

After a packet descriptor has been processed by at least the header modification engine 136, the packet processor 128 stores the header information in the internal packet memory 120 (or another memory (not shown) separate from the packet memory 120, according to some embodiments. In embodiments in which the header information is stored in the packet memory 120, the header information is stored proximate to a location at which a remaining portion of the packet (e.g., at least the payload) is stored. In other embodiments, the header information is stored in the packet memory 120 at a different location than the location at which the remaining portion of the packet is stored.

In some embodiments, the packet processor 128 modifies the packet descriptor to include one or more indications of the locations in the packet memory 120 (or the other memory (not shown)) at which the header information is stored.

In some embodiments in which the packet processor 128 stores the header information in the packet memory 120 (or the other memory (not shown)) after the packet descriptor 140 has been processed by at least the header modification engine 136, the packet processor 128 shortens the packet descriptor by removing the header information, or creates a new packet descriptor that omits the header information.

The network device 104 further comprises a packet grouping processor 148 that is configured to define groups of packets that are to be transmitted via respective same network interfaces 112. In an embodiment, the packet grouping processor 148 receives packet descriptors output by the packet processor 128, each packet descriptor including an indication of a target network interface 112 via which the respective packet is to be transmitted; and the packet grouping processor 148 uses the indications of target network interfaces 112 in the packet descriptors to define groups of packets that are to be transmitted via respective same network interfaces 112. In some embodiments, each packet descriptor also includes an indication of priority level according to which the respective packet is to be transmitted; and the packet grouping processor 148 uses the indications of priority levels in the packet descriptors to define groups of packets that are to be transmitted via respective same network interfaces 112 and correspond to respective same priority levels. In some embodiments, each packet descriptor includes an indication of transmit queue in which the corresponding packet is to be enqueued for transmission; and the packet grouping processor 148 uses the indications of transmit queues in the packet descriptors to define groups of packets that are to be enqueued in same transmit queues for transmission. In some embodiments, as will be described below, the network device 104 includes transmit queues for scheduling the transmission of packets via the network interfaces 112. In an embodiment, a respective set of one or more transmit queues corresponds to a respective network interface 112. For example, a set of different transmit queues corresponds to a single network interface 112, with each transmit queue in the set corresponding to a different priority level according to which packets are to be transmitted via the single network interface 112.

For each of at least some of the groups of packets defined by the packet grouping processor 148, the group includes at least two packets. For very large packets, the packet grouping processor 148 defines groups of packets that each include only one very large packet, according to an embodiment.

In an embodiment, the packet grouping processor 148 generates group descriptors that correspond to the groups of packets defined by the packet grouping processor 148, each group descriptor including information that indicates the group of packets corresponding to the group descriptor. The group descriptor includes information that enables determining the location of each packet belonging to the group within the internal memory 120. In an embodiment in which packets in the group are stored in consecutive memory locations in the internal packet memory 120, the group descriptor includes a starting location of the group of packets in the internal memory 120 and a respective length of each packet in the group. In some embodiments, the group descriptor includes a respective starting location and a respective length of each packet in the group. In some embodiments, in addition to information that enables determining the location of each packet belonging to the group within the internal memory 120, the group descriptor includes other information regarding the packets in the group, such as a respective indication of whether the packet processor 128 detected an error (e.g., a cyclic redundancy check (CRC) error) in each packet in the group. In some embodiments, the group descriptor includes the respective packet descriptors of packets in the group.

The network device 104 further comprises transmit queues 152 for scheduling the transmission of packets via the network interfaces 112. In an embodiment, a respective set of one or more transmit queues corresponds to a respective network interface 112. For example, a set of different transmit queues 152 corresponds to a single network interface 112, with each transmit queue 152 in the set corresponding to a different priority level according to which packets are to be transmitted via the single network interface 112. In some embodiments, each packet descriptor includes one or more indications of a transmit queue 152 corresponding to i) a particular network interface 112, and ii) a particular priority level; and the packet grouping processor 148 uses the one or more such indications in the packet descriptors to define groups of packets that are to be transmitted via respective same network interfaces 112 and correspond to respective same priority levels.

The packet grouping processor 148 stores the group descriptors into appropriate transmit queues 152 corresponding to appropriate target network interfaces 112, according to an embodiment. For example, the packet processor 128 analyzes information in the group descriptors (e.g., target network interface indicators, priority level information, etc.) to determine appropriate transmit queues 152 into which the group descriptors are to be stored. As an illustrative example, respective pluralities of transmit queues 152 correspond to respective network interfaces 112, where each transmit queue 152 corresponding to a single network interface 112 also corresponds to a respective priority level, according to an embodiment. At least some of the transmit queues 152 are arranged as first-in-first-out (FIFO) linked lists, according to an embodiment.

In some embodiments, the packet grouping processor 148 includes, or is coupled to, buffers for storing packet descriptors received from the packet processor 108 while the packet grouping processor 148 is defining groups of packets and/or generating group descriptors. For example, once all packet descriptors corresponding to a group have been received, the packet grouping processor 148 completes generation of a group descriptor and then stores the group descriptor in an appropriate transmit queue 152; storage space in a buffer that was storing the packet descriptors corresponding to the group descriptor is then designated as available for storing newly received packet descriptors, according to an embodiment.

In other embodiments, the packet descriptors from the packet processor 128 are enqueued in the transmit queues 152. Once a set of packet descriptors corresponding to a group have been stored in a transmit queue 152, the packet grouping processor 148 completes generation of a group descriptor corresponding to the set of packet descriptors, and replaces the set of packet descriptors in the transmit queue 152 with the group descriptor, according to an embodiment.

After a group descriptor reaches the head of a transmit queue 152 and a corresponding target network interface 112 is ready to receive a group of packets for transmission, the group descriptor is dequeued from the transmit queue and provided to a transmit processor 166 that corresponds to the target network interface 112. Although only one transmit processor 166 is shown in FIG. 1 merely for ease of explanation, and the one transmit processor 166 is shown as being coupled to only one network interface 112, the network device 104 includes multiple transmit processors 166 and each of the multiple transmit processors 166 is coupled to a respective set of one or more network interfaces 112, in some embodiments. The multiple transmit processors 166 may be considered collectively as a single transmit processor.

The transmit processor 166 retrieves packet data corresponding to the group descriptor from the internal packet memory 120 via the one or more read/write interfaces of the internal packet memory 120. In an embodiment, the transmit processor 166 includes DMA circuitry configured to retrieve packets (or at least payloads of the packets) in the internal packet memory 120 via the one or more read/write interfaces of the internal packet memory 120.

In an embodiment, the group descriptor includes location information that indicates locations in the internal packet memory 120 of packets in the group of packets, and the transmit processor 166 uses the location information to retrieve the packet data corresponding to the group descriptor from the internal packet memory 120. The transmit processor 166 then provides the packet data to the network interface 112 for transmission. In an embodiment in which the transmit processor 166 includes DMA circuitry, the transmit processor 166 uses the location information in the group descriptor to configure the DMA circuitry to retrieve packet information corresponding to the group of packets from the internal memory 120; the DMA circuitry then retrieves the packet information corresponding to the group of packets from the internal memory 120 and provides the packet information to the network interface 112 for transmission.

The storing of a group descriptor in a transmit queue 152 is an example of making a single scheduling decision for a group of packets, according to an embodiment. For example, by storing the group descriptor in the transmit queue 152, a time at which the group of packets is to be transmitted relative to other groups of packets in the transmit queue 152 is determined. Additionally, the group descriptor indicates a transmit order of packets within the group of packets. Thus, the storing of the group descriptor in the transmit queue 152 determines when packets in the group are transmitted relative to other packets in the group and relative to other packets in other groups, according to an embodiment.

The dequeuing of a group descriptor from a transmit queue 152 is an example of making a single transmit decision for a group of packets, according to an embodiment. For example, dequeuing of the group descriptor from the transmit queue 152 initiates transmission of an entire group of packets via a corresponding network interface 152 in a defined order, according to an embodiment.

Figure 2A:
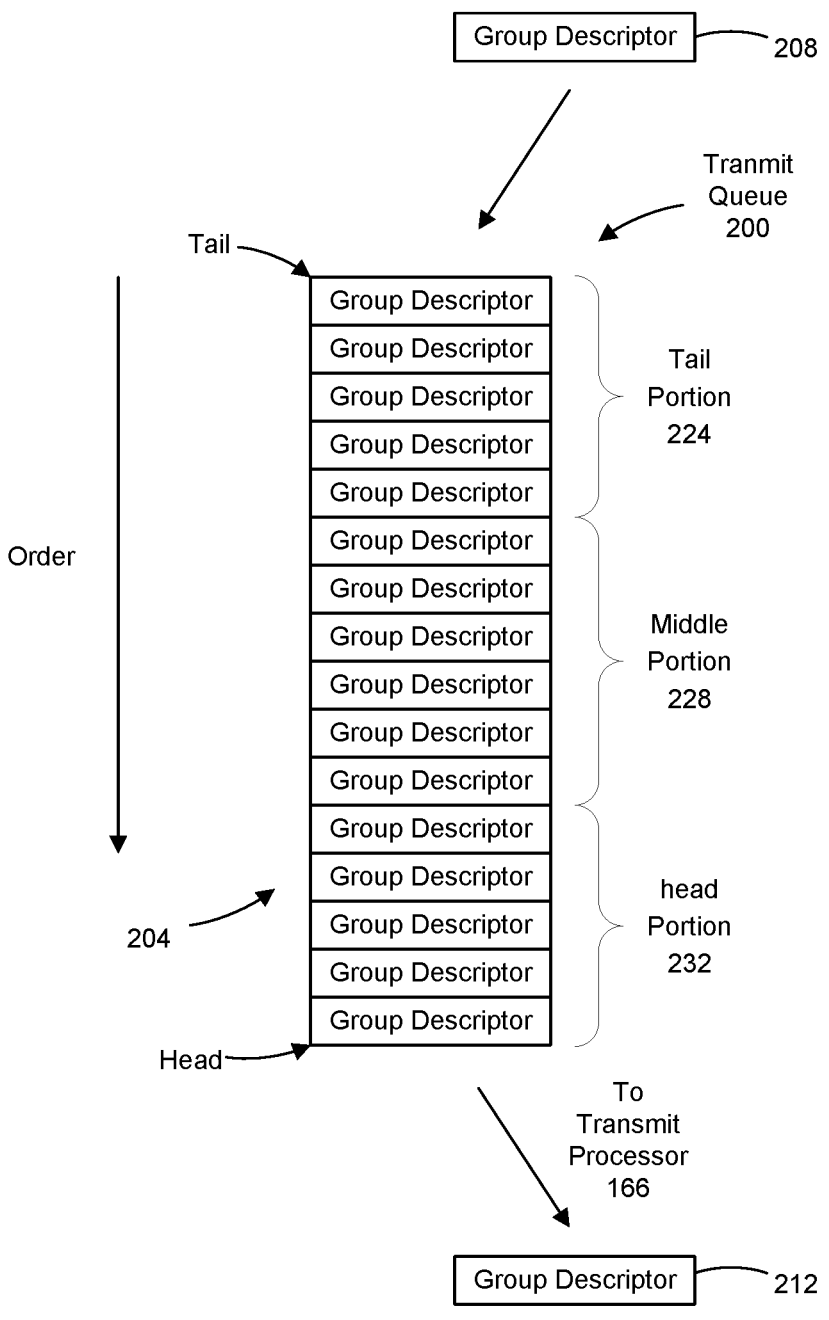
FIGS. 2A-B are simplified diagrams illustrating operation of an example transmit queue of the example network device of FIG. 1, according to an embodiment.

FIG. 2A is a simplified diagram illustrating operation of an example transmit queue 200, according to an embodiment. The transmit queue 200 corresponds to one of the transmit queues 152 of FIG. 1 and is described in the context of the network device 104 of FIG. 1 for ease of explanation. In other embodiments, the transmit queue 200 is utilized in a suitable network device different than the network device 104, and/or one or more of the transmit queues 152 operate in a suitable manner different than the operation of the transmit queue 200.

The transmit queue 200 includes a plurality of enqueued group descriptors 204 arranged in a first-in-first-out (FIFO) order. For example, the group descriptors 204 are arranged as a linked list, with each group descriptor 204 corresponding to an element of the linked list, according to an embodiment. In other embodiments, FIFO ordering of the group descriptors 204 is maintained using a suitable technique that does not involve a linked list.

The group descriptors 204 in the transmit queue 200 correspond to packets that all are scheduled to be transmitted via a same network interface 112, according to an embodiment. For example, an ordering of group descriptors 204 within the transmit queue 200 and an ordering of packets corresponding to each group descriptor 204 specifies a scheduling order in which the packets are to be transmitted via the same network interface 112. In some embodiments, the group descriptors 204 in the transmit queue 200 correspond to packets that all are scheduled to be transmitted via a same network interface 112 and according to a same priority level.

The transmit queue 200 includes a head and a tail, where the head corresponds to an oldest group descriptor in the transmit queue and the tail corresponds to a newest group descriptor. FIG. 2A illustrates a group descriptor 208 that is about to be enqueued in the transmit queue 200. Upon the group descriptor 208 being enqueued in the transmit queue 200, the group descriptor 208 will become the new tail of the transmit queue 200. FIG. 2 also illustrates a group descriptor 212 that was dequeued from the transmit queue 200. Just prior to being dequeued, the group descriptor 212 was at the head of the transmit queue 200.

In some embodiments, the transmit queue 200 is arranged in multiple portions, including a tail portion 224, a middle portion 228, and a head portion 232. The tail portion 224 includes the tail of the transmit queue 200, and the head portion 232 includes the head of the transmit queue 200. The middle portion 228 is between the tail portion 224 and the head portion 232 according to the FIFO order. In some embodiments, the tail portion 224 and the head portion 232 correspond to packets stored in the internal memory 120, whereas the middle portion 228 corresponds to packets stored in the external memory 124, as will be described further below.

Figure 2B:
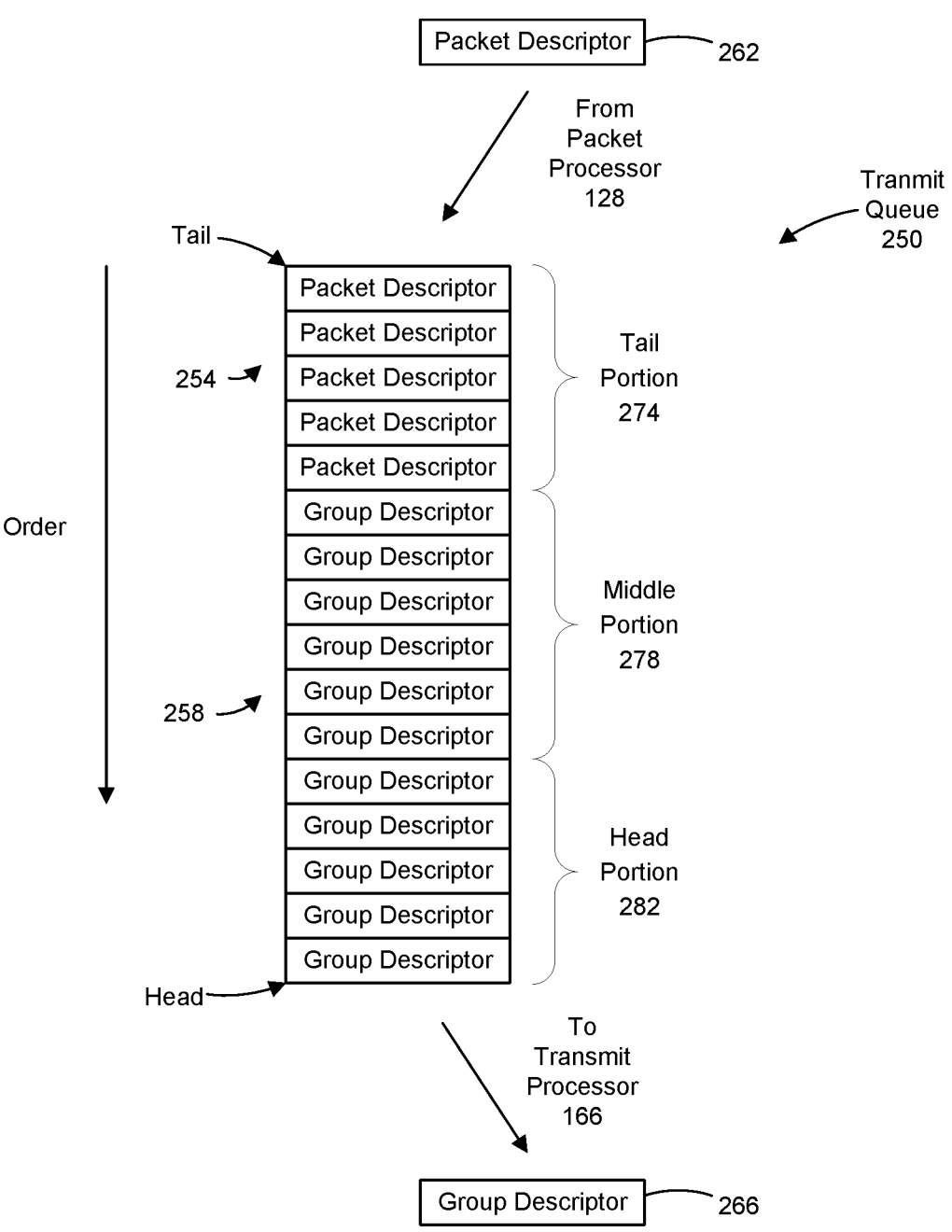

FIG. 2B is a simplified diagram illustrating operation of another example transmit queue 250, according to another embodiment. The transmit queue 250 corresponds to one of the transmit queues 152 of FIG. 1 and is described in the context of the network device 104 of FIG. 1 for ease of explanation. In other embodiments, the transmit queue 250 is utilized in a suitable network device different than the network device 104, and/or one or more of the transmit queues 152 operate in a suitable manner different than the operation of the transmit queue 250.

The transmit queue 250 includes a plurality of enqueued packet descriptors 254 and a plurality of enqueued group descriptors 258 arranged in a FIFO order. For example, the packet descriptors 254 and the group descriptors 258 are arranged as a linked list, with each packet descriptor 254 and each group descriptor 258 corresponding to an element of the linked list, according to an embodiment. In other embodiments, FIFO ordering of packet descriptors 254 and group descriptors 258 is maintained using a suitable technique that does not involve a linked list.

The packet descriptors 254 and the group descriptors 258 in the transmit queue 250 correspond to packets that all are scheduled to be transmitted via a same network interface 112, according to an embodiment. For example, an ordering of packet descriptors 254 and the group descriptors 258 within the transmit queue 250 and an ordering of packets corresponding to each group descriptor 258 specifies a scheduling order in which the packets are to be transmitted via the same network interface 112. In some embodiments, the packet descriptors 254 and the group descriptors 258 in the transmit queue 250 correspond to packets that all are scheduled to be transmitted via a same network interface 112 and according to a same priority level.

The transmit queue 250 includes a head and a tail, where the head corresponds to an oldest group descriptor in the transmit queue and the tail corresponds to a newest packet descriptor. FIG. 2B illustrates a packet descriptor 262 from the packet processor 128 that is about to be enqueued in the transmit queue 250. Upon the packet descriptor 262 being enqueued in the transmit queue 250, the packet descriptor 262 will become the new tail of the transmit queue 250. FIG. 2B also illustrates a group descriptor 266 that was dequeued from the transmit queue 250. Just prior to being dequeued, the group descriptor 266 was at the head of the transmit queue 250.

In some embodiments, the transmit queue 250 is arranged in multiple portions, including a tail portion 274, a middle portion 278, and a head portion 282. The tail portion 274 includes the tail of the transmit queue 250, and the head portion 282 includes the head of the transmit queue 250. The middle portion 278 is between the tail portion 274 and the head portion 282 according to the FIFO order. In some embodiments, the tail portion 274 and the head portion 282 correspond to packets stored in the internal memory 120, whereas the middle portion 278 corresponds to packets stored in the external memory 124, as will be described further below.

In some embodiments, the tail portion 274 includes packet descriptors, whereas the middle portion 278 and the head portion 282 include group descriptors and do not include any packet descriptors. In an embodiment, the packet grouping processor 148 is configured to generate a group descriptor that corresponds to one or more packet descriptors in the tail portion 274, and to replace the one or more packet descriptors in the transmit queue 250 with the generated group descriptor. For example, the packet grouping processor 148 is configured to generate a group descriptor that corresponds to a set of packet descriptors when packets corresponding to the set of packet descriptors meet a threshold, such as a packet count threshold, a cumulative byte count threshold, etc.

In an embodiment, the packet grouping processor 148 is configured to generate a group descriptor that corresponds to multiple packet descriptors in the tail portion 274; remove the multiple packet descriptors from the tail portion 274; and enqueue the generated group descriptor in the middle portion 278.

In embodiments such as described herein, the queuing and dequeuing of group descriptors enables group scheduling of packets for transmission, as opposed to individually scheduling packets for transmission. Because groups of packets are scheduled for transmission per group, as opposed to scheduling each packet individually, the processing speed requirements and/or complexity of the transmit processor 166 are significantly reduced as compared to a transmit processor that schedules the transmission of each packet individually. For example, the dequeuing of group descriptors from the transmit queues 152 occurs at a significantly lower rate as compared to a network device in which packet descriptors are dequeued from transmit queues individually. As the effective bits rates of physical layer (PHY) interfaces and cabling continue to increase, and the use of higher speed PHY interfaces and cabling increases (i.e., increasing wire speeds), the processing speed requirements of transmit processors that must schedule transmission via such PHY interfaces and cables will increase. In such an environment, the capability of the transmit processor 166 to handle high wire speeds with reduced processing speed requirements and/or complexity provides a technical advantage as compared to network devices that schedule packets for transmission individually.

Referring again to FIG. 1, when packet descriptors and/or group descriptors are enqueued in the transmit queues 152, corresponding packets stored in the internal memory 120 may be referred to as being enqueued in transmit queues 152 for transmission. In some embodiments, the network device 104 may allocate (or have targeted) respective amounts of memory in the internal memory 120 for packets enqueued in respective transmit queues 152. In some embodiments, when the allocated (or targeted) amount in the internal memory 120 corresponding to a particular transmit queue 152 rises above a fill level, the transmit queue 152 may be considered as being congested. In some embodiments, the fill level of allocated (or targeted) amounts of memory in the internal memory 120 is measured or inferred by numbers of packet descriptors and/or group descriptors (corresponding to packets stored in the internal memory 120) in a transmit queue 152. For example, as numbers of packet descriptors and/or group descriptors (corresponding to packets stored in the internal memory 120) in a transmit queue 152 increases, this indicates that a number of corresponding packets corresponding to the transmit queue 152 in the internal memory 120 is increasing. Thus, a congestions level of enqueued packets in the internal memory 120 corresponding to a transmit queue 152 is determined using numbers of packet descriptors and/or group descriptors (corresponding to packets stored in the internal memory 120) in the transmit queue 152, according to some embodiments.

In some embodiments, the fill level of allocated (or targeted) amounts of memory in the internal memory 120 is measured or inferred by an accumulation of byte counts stored in packet descriptors and/or group descriptors (corresponding to packets stored in the internal memory 120) in a transmit queue 152. For example, as the accumulation of byte counts stored in packet descriptors and/or group descriptors (corresponding to packets stored in the internal memory 120) in a transmit queue 152 increases, this indicates that a cumulative byte count of packets corresponding to the transmit queue 152 in the internal memory 120 is increasing. Thus, a congestions level of enqueued packets in the internal memory 120 corresponding to a transmit queue 152 is determined using an accumulation of byte counts stored in packet descriptors and/or group descriptors (corresponding to packets stored in the internal memory 120) in the transmit queue 152, according to some embodiments.

The network device 104 further comprises a memory controller 174 that is coupled to the internal packet memory 120 and the external packet memory 124. According to some embodiments, the memory controller 174 is configured to transfer packet data between the internal packet memory 120 and the external packet memory 124 as will be described in more detail below. For example, the receive processor 116 initially stores packets in the internal packet memory 120, and groups of packets are transferred to the external packet memory 124, as needed, allowing packets to spill over into the external packet memory 124. Subsequently, prior to transmission of a group of packets, the group of packets is transferred back to the internal packet memory 120, in an embodiment.

Figures 3A, 3B:
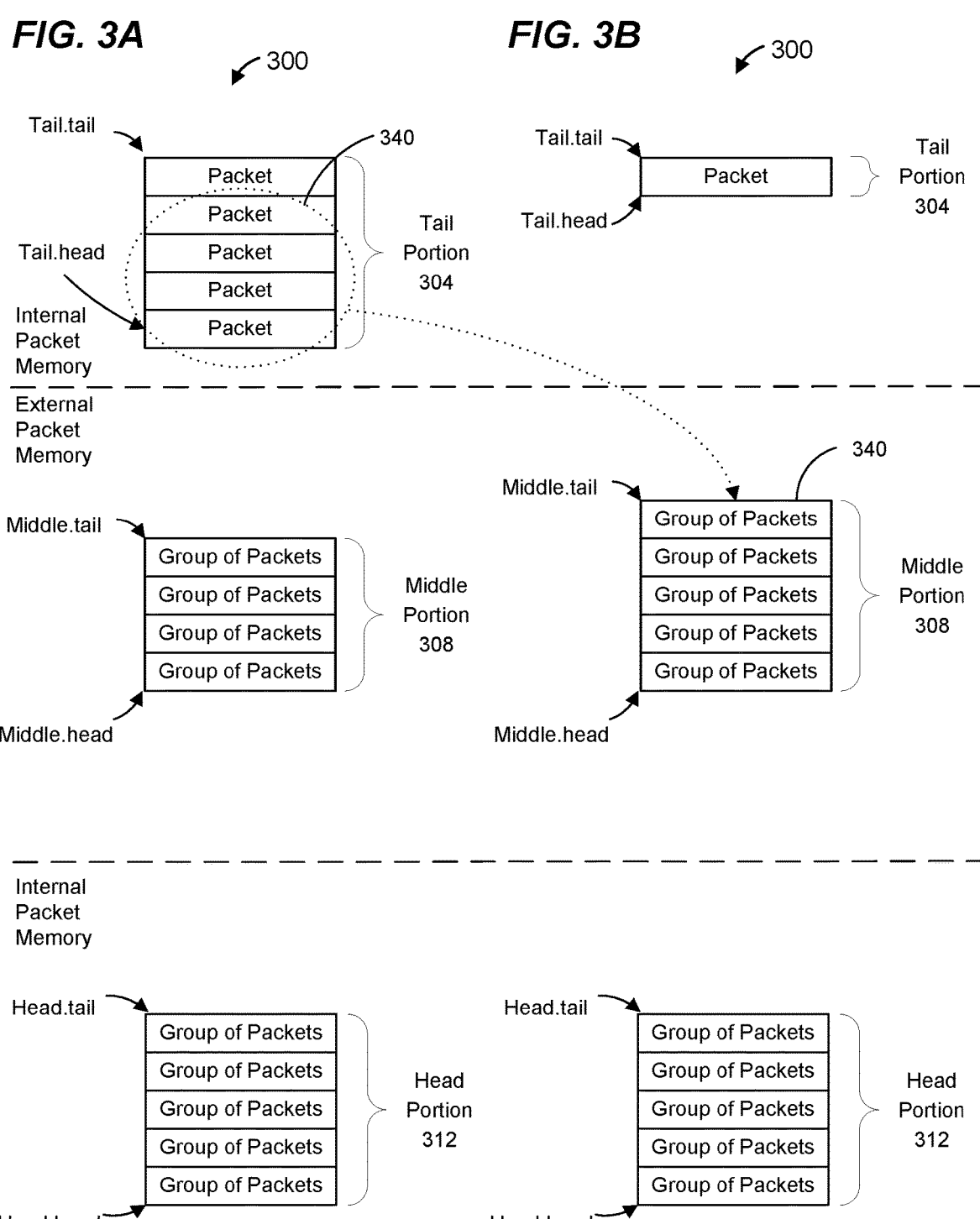
FIGS. 3A-D are simplified diagrams illustrating the storage of packets in the internal packet memory and the external packet memory of the example network device of FIG. 1, according to an embodiment.
Figures 3C, 3D:
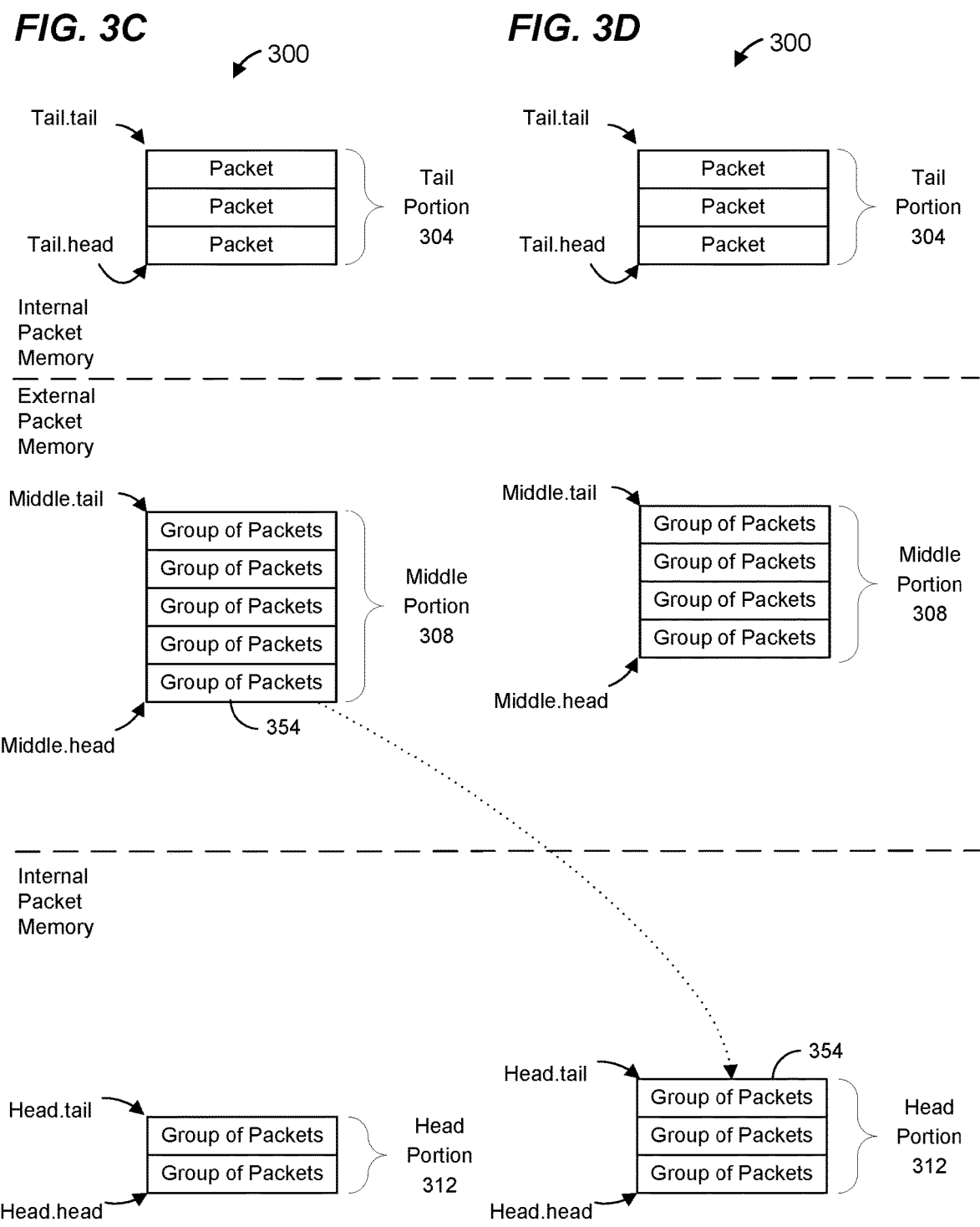

FIGS. 3A-D are simplified diagrams illustrating the storage of packets 300, which correspond to a transmit queue, in an internal memory of a network device and an external memory of the network device, according to an embodiment. In an embodiment, the packets 300 correspond to one of the transmit queues 152 of FIG. 1 and FIGS. 3A-C are described in the context of the network device 104 of FIG. 1 for ease of explanation. In other embodiments, the storage of packets 300 described with reference to FIGS. 3A-C is utilized in a suitable network device different than the network device 104.

The packets 300 may be considered as enqueued in a queue having a tail portion 304, a middle portion 308, and a head portion 312. The tail portion 304 includes a tail (Tail.tail) and a head (Tail.head); the middle portion 308 includes a tail (Middle.tail) and a head (Middle.head); and the head portion 312 includes a tail (Head.tail) and a head (Head.head). In some embodiments, the tail portion 304 corresponds to a tail portion of a transmit queue (e.g., the tail portion 224 (FIG. 2A) or the tail portion 274 (FIG. 2B)); the middle portion 308 corresponds to a middle portion of the transmit queue (e.g., the middle portion 228 (FIG. 2A) or the middle portion 278 (FIG. 2B)); and the head portion 312 corresponds to a head portion of the transmit queue (e.g., the head portion 232 (FIG. 2A) or the head portion 282 (FIG. 2B)).

The queue in which the packets 300 are enqueued maintains a FIFO ordering. New packets are added to the Tail.tail, and packets that are dequeued for transmission are dequeued from the Head.head.

Packets in the tail portion 304 and the head portion 312 are stored in the internal memory 120, whereas packets in the middle portion 308 are stored in the external memory 124.

Referring now to FIG. 3A, a decision to transfer a group of packets from the tail portion 304 in the internal packet memory 120 to the middle portion 308 in the external packet memory 124 is made based on a fill level corresponding to the tail portion 304, according to an embodiment. For example, the packet grouping processor 148 includes a queue monitor 178 that generates a fill level parameter using a packet count, a byte count, etc., of packets stored in the tail portion 304, and determines when the fill level parameter meets a tail portion threshold. In response to the fill level parameter meeting the tail portion threshold, the packet grouping processor 148 identifies a group of consecutive packets 340 in the tail portion 304 that includes the packet at the Tail.head, and generate control signals to prompt the memory controller 174 to transfer the group of packets 340 from the internal packet memory 120 to the middle portion 308 in the external packet memory 124.

In some embodiments, in connection with identifying the group of packets 340 to be transferred to the external packet memory 124, the packet grouping processor 148 generates a group descriptor corresponding to the group of packets 340 and enqueues the group descriptor in the transmit queue 152. In some embodiments that utilize transmit queues as in FIGS. 2B, the packet grouping processor 148 enqueues the group descriptor in a middle portion of the transmit queue.

FIG. 3B illustrates the packets 300 after the group of packets 340 has been transferred from the tail portion 304 in the internal packet memory 120 to the middle portion 308 in the external packet memory 124.

FIG. 3C illustrates the packet 300 at a subsequent time. In FIG. 3C, a number of packets in the tail portion 304 has grown as compared to FIG. 3B, and a number of groups in the header portion 312 has shrunk as compared to FIG. 3B. A decision to transfer a group of packets from the middle portion 308 in the external packet memory 124 to the head portion 312 in the internal packet memory 120 is made based on a fill level corresponding to the head portion 312, according to an embodiment. For example, the queue monitor 178 generates a fill level parameter using a packet count, a byte count, etc., of packets stored in the head portion 312, and determines when the fill level parameter falls below a head portion threshold. In response to the fill level parameter falling below the head portion threshold, the packet grouping processor 148 generate control signals to prompt the memory controller 174 to transfer a group of packets 354 from the external packet memory 124 to the head portion 312 in the internal packet memory 120.

Typically, packets in the tail portion 304 are not stored in the internal packet memory 120 at consecutive memory locations. In contrast, when packets in the tail portion 304 are transferred to the middle portion 308 in the external packet memory in a group, the packets in the group are stored in consecutive memory locations in the external packet memory 124, according to an embodiment. Thus, when the group of packets in the middle portion 308 is subsequently read from the external packet memory 124 for transfer to the head portion 312 in the internal packet memory 120, the transfer is more efficient (as compared to when packets are read from non-consecutive locations) because the packets can be read from consecutive memory locations. Similarly, when transferring the group of packets to the head portion 312 in the internal packet memory 120, the packets in the group are stored in consecutive memory locations in the internal packet memory 124, according to an embodiment. Thus, when the group of packets in the head portion 312 is subsequently read from the internal packet memory 120 for transfer to the network interface 112 for transmission, the transfer is more efficient (as compared to when packets are read from non-consecutive locations) because the packets can be read from consecutive memory locations.

In another embodiment, when transferring the group of packets to the head portion 312 in the internal packet memory 120, the packets in the group are generally not stored in consecutive memory locations in the internal packet memory 124 but rather at least a subset of packets in the group are stored in non-consecutive memory locations.

The receive processor 116 is implemented using i) one or more processors executing machine readable instructions stored in one or more memories, ii) hardware circuitry (e.g., one or more hardware state machines, a hardware pipeline processor, etc.), iii) or a combination of i) and ii), in some embodiments.

The packet processor 128 is implemented using i) one or more processors executing machine readable instructions stored in one or more memories, ii) hardware circuitry (e.g., one or more hardware state machines), iii) or a combination of i) and ii), in some embodiments. In an embodiment, the packet processor 128 comprises a hardware pipeline processor, and the forwarding engine 132 and the header modification engine 136 are pipeline elements of the hardware pipeline processor.

The transmit processor 166 is implemented using i) one or more processors executing machine readable instructions stored in one or more memories, ii) hardware circuitry (e.g., one or more hardware state machines), iii) or a combination of i) and ii), in some embodiments.

Although only one internal packet memory 120 is illustrated in FIG. 1, in some embodiments the network device 104 includes multiple internal packet memories. In some such embodiments, a group of packets may be transferred from one internal packet memory to the external packet memory 124 and then back to the same internal packet memory. In other such embodiments, a group of packets may be transferred from one internal packet memory to the external packet memory 124, and then to another internal packet memory.

In some embodiments, the number of external packet memories 124 that the network device 104 utilizes depends on the buffering capacity required or desired for the network device 104, where the buffering capacity may depend on a location of the network device 104 within a communication network, for example. For example, if the network device 104 is deployed at a core of the communication network, the network device 104 may utilize two external packet memories 124, as an illustrative embodiment. In this case, two external packet memories 124 are coupled to the network device 100 via two respective network interfaces 112, or are provided as chiplets external to the packet processor 128 of the network device 104, in various embodiments. On the other hand, if the network device 104 is deployed at a distribution layer of the communication network, the network device 104 utilizes only a single external packet memory 124, in an embodiment. For example, in this case, only a single network interface 112 of the network device 104 is used for coupling of the network device 104 to the external packet memory 124, or only a single chiplet within the network device 104 implements the external packet memory 124, in an embodiment. As yet another example, if the network device 104 is deployed as an edge device at an edge of the communication network, the network device 104 is configured to buffer all packets, as needed, in only the internal packet memory 120. In this case, no external packet memory 124 need be coupled to, or otherwise provided for, the network device 104. Thus, a same core chip of network device 104 (e.g., a same core packet processor IC chip) is utilized to support various buffering needs of network devices, depending, for example, on a location of the network device within a communication network, in various embodiments.

In some embodiments, the number of external packet memories 124 that the network device 104 utilizes depends on a required access bandwidth to the external packet memories 124. For example, each external packet memory 124 typically has a fixed access bandwidth, so increasing the access bandwidth to the external packet memories 124 requires using more external packet memories 124.

In some embodiments, the external packet memory 124 is omitted; the memory controller 174 is not configured to transfer packets to and from the external packet memory 124, and the packet grouping processor 148 is not configured to prompt the memory controller 174 to transfer packets to and from the external packet memory 124.

The internal packet memory 120 and the external packet memory 124 collectively may be considered a packet buffer. In embodiments in which the external packet memory 124 is omitted, the packet buffer comprises the internal packet memory 120.

In an embodiment, the network device 104 further includes one or more central processing units (CPUs) (not shown).

FIG. 4 is a flow diagram illustrating an example method 400 for processing packets in a network device, according to an embodiment. In some embodiments, the network device 104 of FIG. 1 implements the method 400 to process packets. In some embodiments, the method 400 additionally or alternatively involves the queueing and/or memory storage techniques described with reference to FIGS. 2A-3D. FIG. 4 is described with reference to FIG. 1 merely for ease of explanation. In other embodiments, however, the method 400 is implemented by a suitable network device different than the network device 104 of FIG. 1, and/or is implemented using suitable queueing techniques and/or suitable memory storage techniques different than those described with reference to FIGS. 2A-3D.

At block 404, a network device receives a plurality of packets via a plurality of network interfaces. For example, the network device 104 receives a plurality of packets via the plurality of network interfaces 112.

At block 408, the plurality of packets received at block 404 are stored in a packet buffer of the network device. For example, the receive processor 116 stores packets received via the network interfaces 112 in the internal packet memory 120.

At block 412, the network device defines groups packets among the packets stored in the packet buffer, with each of at least some of the groups of packets including at least two packets. For example, the packet grouping processor 148 generates group descriptors that define respective groups of packets stored in the packet buffer with each of at least some of the groups of packets including at least two packets. In some embodiments, generating a group descriptor comprises generating the group descriptor to include a quantity of packets in the respective group of multiple packets.

In another embodiment, the method 400 further comprises the network device generating, for each packet in the transmit buffer, a packet descriptor that includes metadata regarding the packet; and defining groups of packets at block 412 comprises, for each group of packets, generating a respective group descriptor that includes metadata regarding the respective group of packets, the metadata including information that specifies which packet(s) is/are included in the respective group of packets.

At block 416, the network device makes respective single transmit decisions that respective groups of packets in the transmit buffer are to be transmitted from the network device via respective network interfaces, with at least some of the single transmit decisions corresponds to respective groups of at least two packets. In embodiments that include generating group descriptors, making respective single transmit decisions at block 416 comprises using respective group descriptors to make respective single transmit decisions. For example, the dequeuing of each group descriptor from a transmit queue 152 corresponds to single decision to transmit the corresponding group of packets via a corresponding network interface 112. In an embodiment, the transmit processor 166 dequeues group descriptors from the transmit queues 152.

At block 420, in response to each single transmit decision, the network device transfers the corresponding group of multiple packets to a corresponding network interface for transmission from the network device. For example, in response to receiving a group descriptor dequeued from a transmit queue 152, the transmit processor 166 retrieves the group of packets from the internal packet memory 120 and transfers the group of packets to a corresponding network interface 112 for transmission.

In some embodiments, the method 400 further includes scheduling groups of packets for transmission from the network device via respective network interfaces. In some embodiments that include generating group descriptors, scheduling groups of packets for transmission from the network device via a network interface comprises storing the group descriptors in a FIFO queue that corresponds to the network interface. In some such embodiments, making respective single transmit decisions at block 416 comprises dequeuing respective group descriptors from the FIFO queue, each dequeuing of a respective group descriptor corresponding to a decision to transmit the corresponding group of packets, where the dequeuing of each group of two or more packets corresponds to a single decision to transmit the corresponding group of two or more packets.

In some embodiments that include generating packet descriptors and group descriptors, generating a group descriptor comprises generating the group descriptor to include respective packet descriptors corresponding to packets in the group of packets. In other embodiments that include generating packet descriptors and group descriptors, generating a group descriptor comprises generating the group descriptor to include only respective subsets of information from respective packet descriptors corresponding to packets in the group of packets.

Figure 5:
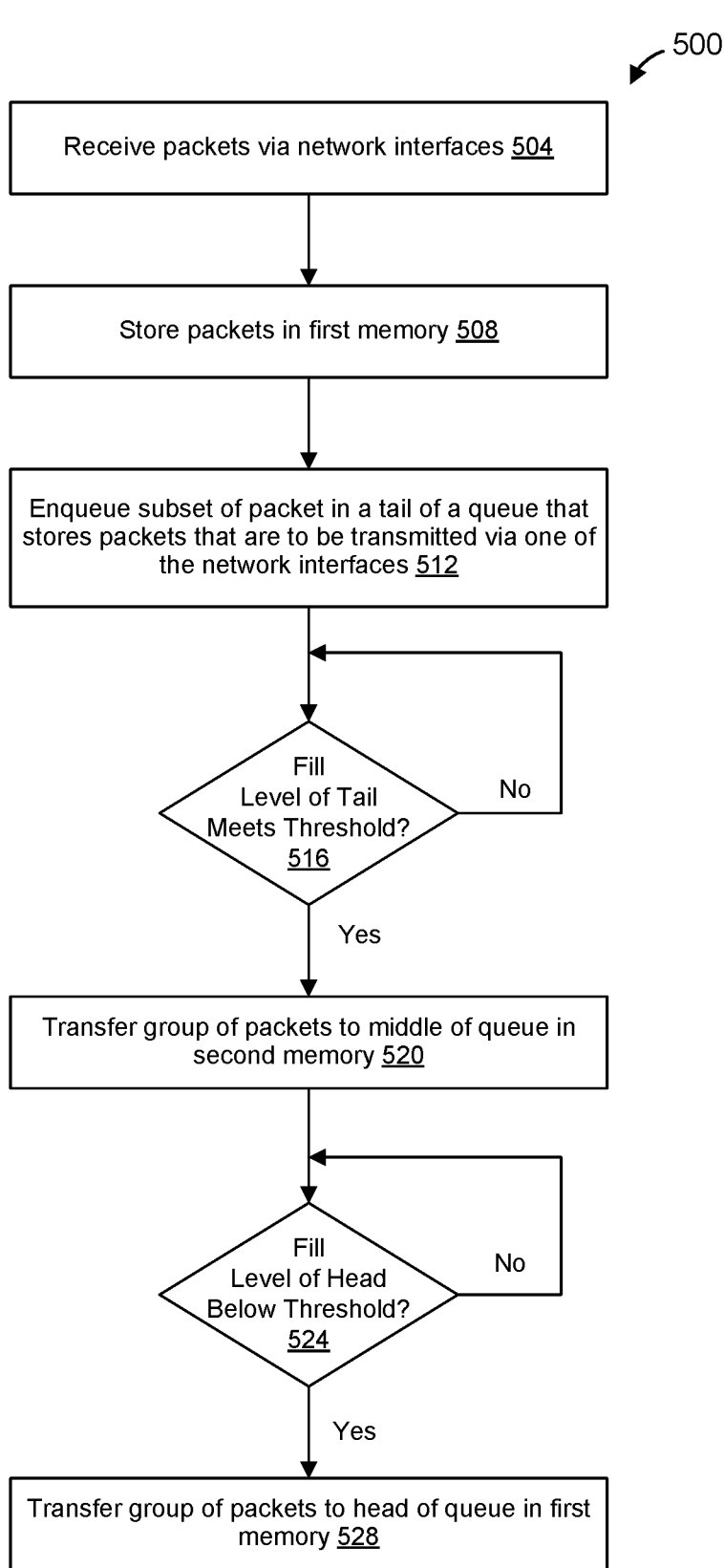
FIG. 5 a flow diagram of another example method for processing packets in a network device configured to transfer groups of at least two packets between a first packet memory and a second packet memory, according to another embodiment.

FIG. 5 is a flow diagram illustrating another example method 500 for processing packets in a network device, according to another embodiment. In some embodiments, the network device 104 of FIG. 1 implements the method 500 to process packets. In some embodiments, the method 500 additionally or alternatively involves the queueing and/or or memory storage techniques described with reference to FIGS. 2A-3D. FIG. 5 is described with reference to FIGS. 1 and 3A-D merely for ease of explanation. In other embodiments, however, the method 500 is implemented by a suitable network device different than the network device 104 of FIG. 1, and/or is implemented using suitable queueing techniques and/or suitable memory storage techniques different than those described with reference to FIGS. 2A-3D.

At block 504, a network device receives a plurality of packets via a plurality of network interfaces. For example, the network device 104 receives a plurality of packets via the plurality of network interfaces 112.

At block 508, the network device stores the plurality of packets received at block 404 in a first memory of the network device. For example, the receive processor 116 stores packets received via the network interfaces 112 in the internal packet memory 120.

At block 512, the network device enqueues a subset of the plurality of packets in a tail portion of a queue that stores packets that are to be transmitted via a network interface of the network device, where the queue also includes a middle portion and a head portion. For example, after the forwarding engine 132 determines a target network interface 112 for a packet and while the packet is stored in the internal packet memory 120, a packet descriptor corresponding to the packet is stored in a transmit queue 152 corresponding to the target network interface 112. The storing of the packet descriptor in the transmit queue 152 while the packet is stored in the internal memory 120 corresponds to enqueuing the packet in a tail of a queue that stores packets that are to be transmitted via a network interface of the network device, according to an embodiment. In another embodiment, the packet grouping processor 148 buffers packet descriptors from the packet processor 128 that are intended for a same target network interface 112 until enough packet descriptors are received to generate a group descriptor; then the packet grouping processor 148 enqueues the group descriptor is in a transmit queue 152 corresponding to the target network interface 112. The storing of the group descriptor in the transmit queue 152 while the group of packets is stored in the internal memory 120 corresponds to enqueuing packets in a tail of a queue that stores packets that are to be transmitted via a network interface of the network device, according to an embodiment.

At block 516, the network device determines a fill level of the tail of the queue and compares the fill level to a threshold. For example, the queue monitor 178 generates a fill level parameter using a packet count, a byte count, etc., of packets stored in the tail portion 304 of the queue 300; and the queue monitor 178 determines when the fill level meets the threshold. When the fill level does not meet the threshold, the flow repeats block 516. On the other hand, in response to determining the fill level meets the threshold, the flow proceeds to block 520.

At block 520, the network device transfers a group of packets from the tail of the queue in the first memory to the middle portion of the queue in a second memory. In an embodiment, the first memory is an internal memory of the network device and the second memory is an external memory of the network device. In another embodiment, the first memory is a first internal memory of the network device and the second memory is a second internal memory of the network device.

As an illustrative example, the packet grouping processor 148 generates control signals that control the memory controller 174 to transfer a group of packets from the tail portion in the internal memory 120 to the middle portion in the external memory 124.

At block 524, the network device determines a fill level of the head portion of the queue and compares the fill level to a threshold. For example, the queue monitor 178 generates a fill level parameter using a packet count, a byte count, etc., of packets stored in the head portion 312 of the queue 300; and the queue monitor 178 determines when the fill level falls below the threshold. When the fill level meets the threshold, the flow repeats block 524. On the other hand, in response to determining the fill level falls below the threshold, the flow proceeds to block 528.

At block 528, the network device transfers a group of packets from the middle portion of the queue in the second memory to the head portion of the queue in the first memory. In another embodiment, the network device transfers the group of packets from the middle portion of the queue in the second memory to the head portion of the queue in a third memory.

As an illustrative example, the packet grouping processor 148 generates control signals that control the memory controller 174 to transfer a group of packets from the middle portion in the external memory 124 to the head portion in the internal memory 120.

FIG. 6 is a simplified block diagram of an example group descriptor 600 that is used with various example implementations described above, according to some embodiments. The example group descriptor 600 is used in some embodiments in which packets in a group are store in consecutive memory locations in a memory, such as the external memory 124 or the internal memory 120.

The group descriptor 600 includes metadata data 604 for a group of packets. For example, the metadata data 604 includes a field 608 that stores an indicator of a quantity of packets in the group that corresponds to the group descriptor 600. As another example, the metadata data 604 includes a field 612 that stores a starting location of a set of consecutive memory locations in the memory at which the group of packets is stored. In other embodiments, one or both of the fields 608, 612 is omitted and/or additional fields that store other suitable metadata for the group of packets is included in the metadata 604.

The group descriptor 600 also includes respective metadata data 616 for each individual packet in the group of packets. For example, each set of metadata data 616 includes a field 620 that stores an indicator of a length of the packet. As another example, each set of metadata data 616 includes a field 624 that stores an indication of whether the network device detected an error corresponding to the packet, such as a cyclic redundancy check (CRC) error. In other embodiments, one or both of the fields 620, 624 is omitted and/or additional fields that store other suitable metadata for each packet is included in each set of metadata 616.

FIG. 7 is a simplified block diagram of another example group descriptor 700 that is used with various example implementations described above, according to some other embodiments. The example group descriptor 700 is used in some embodiments in which packets in a group are store in non-consecutive memory locations in a memory, such as the internal memory 120. However, the group descriptor 700 can also be used in some embodiments in which packets in a group are store in consecutive memory locations in a memory.

The group descriptor 700 includes metadata data 704 for a group of packets. For example, the metadata data 704 includes the field 608 that stores the indicator of the quantity of packets in the group that corresponds to the group descriptor 700. In other embodiments, the field 608 is omitted and/or additional fields that store other suitable metadata for the group of packets is included in the metadata 704.

The group descriptor 700 also includes respective metadata data 716 for each individual packet in the group of packets. For example, each set of metadata data 716 includes a field 720 that stores a starting location in the memory at which the packet is stored. As another example, each set of metadata data 716 includes the field 620 that stores the indicator of the length of the packet. As another example, each set of metadata data 716 includes the field 624 that stores the indication of whether the network device detected an error corresponding to the packet. In other embodiments, one or more of the fields 720, 620, 624 is omitted and/or additional fields that store other suitable metadata for each packet is included in each set of metadata 716.

FIG. 8 is a simplified block diagram of another example group descriptor 800 that is used with various example implementations described above, according to some other embodiments.

The group descriptor 800 includes metadata data 804 for a group of packets. For example, the metadata data 804 includes the field 608 that stores the indicator of the quantity of packets in the group that corresponds to the group descriptor 800. In other embodiments, the field 608 is omitted and/or additional fields that store other suitable metadata for the group of packets is included in the metadata 804.

The group descriptor 800 also includes respective packet descriptors 808 for each individual packet in the group of packets. In some embodiments, each packet descriptor 808 includes metadata for a corresponding packet such as described above.

Embodiment 1: A network device, comprising: a plurality of network interfaces configured to couple to a plurality of network links; a packet buffer; a receive processor configured to store in the packet buffer packets that are received by the network device via the plurality of network interfaces; a packet processor configured to process packets received via the plurality of network interfaces to make forwarding decisions regarding the packets; a packet group processor configured to define groups of packets among packets that are being processed by the network device, each of at least some of the groups of packets defining a respective group of at least two different packets, each group including one or more packets to be transmitted via a respective same network interface; and a transmit processor. The transmit processor is configured to: make a single transmit decision that a particular group of at least two packets in the transmit buffer is to be transmitted via a corresponding network interface, and in response to the single transmit decision, transfer the particular group of at least two packets to the corresponding network interface for transmission.

Embodiment 2: The network device of claim 1, wherein: the packet processor is further configured to generate, for each packet in the transmit buffer, a packet descriptor that includes metadata regarding the packet; the packet grouping processor that is configured to generate, for each group of at least two packets, a respective group descriptor that includes metadata regarding the respective group of packets, the metadata including information that specifies at least which packets are included in the respective group of packets; and the transmit processor is further configured to make the single transmit decision using a particular group descriptor corresponding to the particular group of multiple packets.

Embodiment 3: The network device of embodiment 2, further comprising: a plurality of first-in-first-out (FIFO) queues; wherein the packet grouping processor is further configured to schedule groups of multiple packets for transmission from the network device via the particular network interface, including storing group descriptors corresponding to the groups of multiple packets for transmission via the particular network interface in a particular FIFO queue corresponding to the particular network interface; and wherein the transmit processor is further configured to dequeue the particular group descriptor from the particular FIFO queue as part of making the single transmit decision, the dequeuing of the particular group descriptor corresponding to a decision to transmit the particular group of multiple packets.

Embodiment 4: The network device of either of embodiments 2 or 3, wherein the packet grouping processor is further configured to: generate each group descriptor to include respective packet descriptors corresponding to packets that are members of the respective group of at least two packets.

Embodiment 5: The network device of either of embodiments 2 or 3, wherein the packet grouping processor is further configured to: generate each group descriptor to include only respective subsets of information taken from respective packet descriptors corresponding to packets that are members of the respective group of at least two packets.

Embodiment 6: The network device of any of embodiments 2-5, wherein the packet grouping processor is further configured to: generate each group descriptor to include a respective quantity of packets in the respective group of at least two packets.

Embodiment 7: The network device of any of embodiments 1-6, wherein: the packet buffer comprises a first packet memory and a second packet memory; the receiver processor is configured to store in the first packet memory the packets that are received by the network device via the plurality of network interfaces; the network device further comprises memory controller configured to transfer groups of at least two packets from the first packet memory to the second packet memory, and to transfer the groups of at least two packets from the second packet memory back to the first packet memory prior to the groups of packets being transmitted from the network device via the plurality of network interfaces; and the transmit processor is configured to, in response to the single transmit decision, transfer the particular group of at least two packets from the first packet memory to the corresponding network interface for transmission.

Embodiment 8: The network device of embodiment 7, wherein the packet group processor is configured to: in connection with defining a particular group of at least two packets among packets stored in the packet buffer, control the memory controller to transfer the particular group of at least two packets from the first packet memory to the second packet memory.

Embodiment 9: The network device of either of embodiments 7 or 8, wherein the memory controller is configured to, as part of transferring groups of at least two packets from the second packet memory back to the first packet memory: write each group of at least two packets to a respective set of consecutive memory locations in the first packet memory so that, when the group of at least two packets is to be transmitted from the network device, the transmit processor will read the group of packets from consecutive memory locations in the first packet memory.

Embodiment 10: The network device of either of embodiments 7 or 8, wherein the memory controller is configured to, as part of transferring groups of at least two packets from the second packet memory back to the first packet memory: write a first packet in the group of at least two packets to a first memory location in the first packet memory and write a second packet in the group of at least two packets to a second memory location in the first packet memory that is non-consecutive with the first memory location so that, when the group of at least two packets is to be transmitted from the network device, the transmit processor will read the group of packets from non-consecutive memory locations in the first packet memory.

Embodiment 11: The network device of any of embodiments 7-10, wherein the memory controller is configured to, as part of transferring groups of at least two packets from the first packet memory to the second packet memory: for each group of at least two packets, read packets that are members of the group from non-consecutive memory locations in the first packet memory; and write each group of at least two packets to a respective set of consecutive memory locations in the second packet memory so that, when the group of at least two packets is to be transferred back to the first packet memory, the memory controller will read the group of packets from consecutive memory locations in the second packet memory.

Embodiment 12: A method for processing packets at a network device, comprising: storing in a packet buffer of the network device packets for transmission from the network device via a network interface of the network device; defining, at the network device, groups of packets among packets being processed by the network device, each of at least some of the groups of packets including at least two packets; making respective single transmit decisions, at the network device, that respective groups of packets in the transmit buffer are to be transmitted from the network device via the network interface, including making respective single transmit decisions that respective groups of at least two packets in the transmit buffer are to be transmitted from the network device via the network interface; and in response to each single transmit decision, transferring, by the network device, the corresponding group of packets to the network interface for transmission.

Embodiment 13: The method for processing packets of embodiment 12, further comprising: generating, for each packet in the transmit buffer, a packet descriptor that includes metadata regarding the packet; wherein defining groups of at least two packets comprises, for each group of at least two packets, generating a respective group descriptor that includes metadata regarding the respective group of at least two packets, the metadata including information that specifies which packets are members of the respective group of packets; and wherein making respective single transmit decisions comprises making the respective single transmit decisions using respective group descriptors.

Embodiment 14: The method for processing packets of embodiment 13, further comprising: scheduling groups of at least two packets for transmission via the network interface, including storing in a first-in-first-out (FIFO) queue of the network device the group descriptors; wherein making respective single transmit decisions comprises dequeuing respective group descriptors from the FIFO queue, each dequeuing of a respective group descriptor corresponding to a decision to transmit the corresponding group of at least two packets.

Embodiment 15: The method for processing packets of either of embodiments 13 or 14, wherein generating the respective group descriptor comprises: generating the group descriptor to include respective packet descriptors corresponding to packets that are members of the respective group of at least two packets.

Embodiment 16: The method for processing packets of either of embodiments 13 or 14, wherein generating the respective group descriptor comprises: generating the group descriptor to include only respective subsets of information from respective packet descriptors corresponding to packets that are members of the respective group of at least two packets.

Embodiment 17: The method for processing packets of any of embodiments 13-16, wherein generating the respective group descriptor comprises: generating the group descriptor to include a quantity of packets that are members of the respective group of at least two packets.

Embodiment 18: The method for processing packets of any of embodiments 12-17, wherein: the packet buffer comprises a first packet memory and a second packet memory; storing packets for transmission in the packet buffer comprises storing the packets for transmission in the first packet memory; transferring, by the network device, groups of at least two packets from the first packet memory to the second packet memory; transferring, by the network device, the groups of at least two packets from the second packet memory back to the first packet memory prior to the groups of packets being transmitted from the network device via the plurality of network interfaces; and transferring the corresponding group of at least two packets to the network interface for transmission in response to each single transmit decision comprises: in response to the single transmit decision, transferring the particular group of at least two packets from the first packet memory to the corresponding network interface for transmission.

Embodiment 19: The method for processing packets of embodiment 18, wherein transferring groups of at least two packets from the first packet memory to the second packet memory comprises: in connection with defining a particular group of at least two packets among packets stored in the packet buffer, transferring the particular group of at least two packets from the first packet memory to the second packet memory.

Embodiment 20: The method for processing packets of either of embodiments 18 or 19, wherein transferring groups of at least two packets from the second packet memory back to the first packet memory comprises: writing each group of at least two packets to a respective set of consecutive memory locations in the first packet memory so that, when the group of at least two packets is to be transmitted from the network device, the group of packets will be read from consecutive memory locations in the first packet memory.

Embodiment 21: The method for processing packets of either of embodiments 18 or 19, wherein transferring groups of at least two packets from the second packet memory back to the first packet memory comprises: writing a first packet in the group of at least two packets to a first memory location in the first packet memory and writing a second packet in the group of at least two packets to a second memory location in the first packet memory that is non-consecutive with the first memory location so that, when the group of at least two packets is to be transmitted from the network device, the transmit processor will read the group of packets from non-consecutive memory locations in the first packet memory.

Embodiment 22: The method for processing packets of any of embodiments 18-21, wherein transferring groups of at least two packets from the first packet memory to the second packet memory comprises: for each group of at least two packets, reading packets that are members of the group from non-consecutive memory locations in the first packet memory; and writing each group of at least two packets to a respective set of consecutive memory locations in the second packet memory so that, when the group of at least two packets is to be transferred back to the first packet memory, the group of packets will be read from consecutive memory locations in the second packet memory.

At least some of the various blocks, operations, and techniques described above are suitably implemented utilizing dedicated hardware, such as one or more of discrete components, an integrated circuit, an application-specific integrated circuit (ASIC), a programmable logic device (PLD), a processor executing firmware instructions, a processor executing software instructions, or any combination thereof. When implemented utilizing a processor executing software or firmware instructions, the software or firmware instructions may be stored in any suitable computer readable memory such a read-only memory (ROM), a random-access memory (RAM), etc. The software or firmware instructions may include machine readable instructions that, when executed by one or more processors, cause the one or more processors to perform various acts.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A network device, comprising:
a plurality of network interfaces configured to couple to a plurality of network links;
a packet buffer;
a receive processor configured to store in the packet buffer packets that are received by the network device via the plurality of network interfaces;
a plurality of first-in-first-out (FIFO) queues;
a packet processor configured to i) process packets received via the plurality of network interfaces to make forwarding decisions regarding the packets, ii) generate, for each of at least some of the packets received via the plurality of network interfaces, a packet descriptor that includes metadata regarding the packet, and iii) store the packet descriptors in FIFO queues corresponding to network interfaces via which the packets are to be transmitted;
a packet grouping processor configured to define groups of packets among packets that are being processed by the network device, each of at least some of the groups of packets defining a respective group of at least two different packets, each group including one or more packets to be transmitted via a respective same network interface, the packet grouping processor further configured to, for each group of at least two packets, i) define the group using packet descriptors a) corresponding to the at least two packets and b) stored in a FIFO queue corresponding to a network interface via which the at least two packets are to be transmitted, ii) generate a respective group descriptor for the group, and iii) store the group descriptor in the FIFO queue corresponding to the network interfaces via which the at least two packets are to be transmitted; and
a transmit processor configured to:
make a single transmit decision that a particular group of at least two packets is to be transmitted via a corresponding network interface at least by dequeuing a group descriptor corresponding to the particular group from a FIFO queue corresponding to the network interface, and
in response to dequeuing the group descriptor corresponding to the particular group from the FIFO queue corresponding to the network interface, transfer the particular group of at least two packets to the corresponding network interface for transmission.

2. The network device of claim 1, wherein:
the packet grouping processor is further configured to generate, for each group of at least two packets, the respective group descriptor to include metadata regarding the respective group of packets, the metadata including information that specifies at least which packets are included in the respective group of packets.

3. The network device of claim 2, wherein:
the packet grouping processor is further configured to schedule groups of multiple packets for transmission from the network device via the particular network interface, including storing group descriptors corresponding to the groups of multiple packets for transmission via the particular network interface in a particular FIFO queue corresponding to the particular network interface.

4. The network device of claim 2, wherein the packet grouping processor is further configured to:
generate each group descriptor to include respective packet descriptors corresponding to packets that are members of the respective group of at least two packets.

5. The network device of claim 2, wherein the packet grouping processor is further configured to:
generate each group descriptor to include only respective subsets of information taken from respective packet descriptors corresponding to packets that are members of the respective group of at least two packets.

6. The network device of claim 2, wherein the packet grouping processor is further configured to:
generate each group descriptor to include a respective quantity of packets in the respective group of at least two packets.

7. The network device of claim 1, wherein:
the packet buffer comprises a first packet memory and a second packet memory;
the receiver processor is configured to store in the first packet memory the packets that are received by the network device via the plurality of network interfaces;
the network device further comprises memory controller configured to transfer groups of packets from the first packet memory to the second packet memory, and to transfer the groups of packets from the second packet memory back to the first packet memory prior to the groups of packets being transmitted from the network device via the plurality of network interfaces; and
the transmit processor is configured to, in response to the single transmit decision, transfer the particular group of packets from the first packet memory to the corresponding network interface for transmission.

8. The network device of claim 7, wherein the packet grouping processor is configured to:
in connection with defining a particular group of at least two packets among packets stored in the packet buffer, control the memory controller to transfer the particular group of at least two packets from the first packet memory to the second packet memory.

9. The network device of claim 7, wherein the memory controller is configured to, as part of transferring groups of at least two packets from the second packet memory back to the first packet memory:
write each group of at least two packets to a respective set of consecutive memory locations in the first packet memory so that, when the group of at least two packets is to be transmitted from the network device, the transmit processor will read the group of packets from consecutive memory locations in the first packet memory.

10. The network device of claim 7, wherein the memory controller is configured to, as part of transferring groups of at least two packets from the second packet memory back to the first packet memory:
write a first packet in the group of at least two packets to a first memory location in the first packet memory and write a second packet in the group of at least two packets to a second memory location in the first packet memory that is non-consecutive with the first memory location so that, when the group of at least two packets is to be transmitted from the network device, the transmit processor will read the group of packets from non-consecutive memory locations in the first packet memory.

11. The network device of claim 7, wherein the memory controller is configured to, as part of transferring groups of at least two packets from the first packet memory to the second packet memory:

for each group of at least two packets, read packets that are members of the group from non-consecutive memory locations in the first packet memory; and write each group of at least two packets to a respective set of consecutive memory locations in the second packet memory so that, when the group of at least two packets is to be transferred back to the first packet memory, the memory controller will read the group of packets from consecutive memory locations in the second packet memory.

12. The network device of claim 1, wherein the packet grouping processor is configured to, for each group of at least two packets:

replace the packet descriptors corresponding to the at least two packets in the FIFO queue with the group descriptor for the group.

13. A method for processing packets at a network device, the method comprising:

storing in a packet buffer of the network device packets for transmission from the network device via a network interface of the network device;

generating, for each of at least some of the packets, a packet descriptor that includes metadata regarding the packet, storing in a first-in-first-out (FIFO) queue of the network device packet descriptors;

defining, at the network device, groups of packets among packets being processed by the network device, each of at least some of the groups of packets including at least two packets, the defining of the groups of packets including, for each group of at least two packets, i) defining the group using packet descriptors a) corresponding to the at least two packets and b) stored in the FIFO queue, and ii) generating a respective group descriptor;

storing in the FIFO queue of the network device the group descriptors;

making respective single transmit decisions, at the network device, that respective groups of packets in the packet buffer are to be transmitted from the network device via the network interface, including making respective single transmit decisions that respective groups of at least two packets in the packet buffer are to be transmitted from the network device via the network interface, the making of each of at some of the single transmit decisions including dequeuing a respective group descriptor corresponding to the respective group from the FIFO queue; and for each of at least some of the groups of packets in the packet buffer, transferring, by the network device, the corresponding group of packets to the network interface for transmission in response to dequeuing the corresponding group descriptor from the FIFO queue.

14. The method for processing packets of claim 13, further comprising:

wherein defining groups of packets comprises, for each group of at least two packets, generating the respective group descriptor to include metadata regarding the respective group of at least two packets, the metadata including information that specifies which packets are members of the respective group of packets.

15. The method for processing packets of claim 14, further comprising:

scheduling groups of packets for transmission via the network interface, including the storing of the group descriptors in the FIFO.

16. The method for processing packets of claim 14, wherein generating the respective group descriptor comprises:

generating the group descriptor to include respective packet descriptors corresponding to packets that are members of the respective group of packets.

17. The method for processing packets of claim 14, wherein generating the respective group descriptor comprises:

generating the group descriptor to include only respective subsets of information from respective packet descriptors corresponding to packets that are members of the respective group of at least two packets.

18. The method for processing packets of claim 14, wherein generating the respective group descriptor comprises:

generating the group descriptor to include a quantity of packets that are members of the respective group of packets.

19. The method for processing packets of claim 13, wherein:

the packet buffer comprises a first packet memory and a second packet memory;

storing packets for transmission in the packet buffer comprises storing the packets for transmission in the first packet memory;

transferring, by the network device, groups of at least two packets from the first packet memory to the second packet memory;

transferring, by the network device, the groups of at least two packets from the second packet memory back to the first packet memory prior to the groups of packets being transmitted from the network device via the plurality of network interfaces; and transferring the corresponding group of at least two packets to the network interface for transmission in response to each single transmit decision comprises: in response to the single transmit decision, transferring the particular group of at least two packets from the first packet memory to the corresponding network interface for transmission.

20. The method for processing packets of claim 19, wherein transferring groups of at least two packets from the first packet memory to the second packet memory comprises:

in connection with defining a particular group of at least two packets among packets stored in the packet buffer, transferring the particular group of at least two packets from the first packet memory to the second packet memory.

21. The method for processing packets of claim 19, wherein transferring groups of at least two packets from the second packet memory back to the first packet memory comprises:

writing each group of at least two packets to a respective set of consecutive memory locations in the first packet memory so that, when the group of at least two packets is to be transmitted from the network device, the group of packets will be read from consecutive memory locations in the first packet memory.

22. The method for processing packets of claim 19, wherein transferring groups of at least two packets from the second packet memory back to the first packet memory comprises:

writing a first packet in the group of at least two packets to a first memory location in the first packet memory and writing a second packet in the group of at least two packets to a second memory location in the first packet memory that is non-consecutive with the first memory location so that, when the group of at least two packets is to be transmitted from the network device, the transmit processor will read the group of packets from non-consecutive memory locations in the first packet memory.

23. The method for processing packets of claim 19, wherein transferring groups of at least two packets from the first packet memory to the second packet memory comprises:

for each group of at least two packets, reading packets that are members of the group from non-consecutive memory locations in the first packet memory; and writing each group of at least two packets to a respective set of consecutive memory locations in the second packet memory so that, when the group of at least two packets is to be transferred back to the first packet memory, the group of packets will be read from consecutive memory locations in the second packet memory.

24. The method for processing packets of claim 13, further comprising:

for each group of at least two packets, replacing packet descriptors corresponding to the at least two packets in the FIFO queue with the group descriptor for the group.

* * * * *